(12) United States Patent
Noguchi et al.

(10) Patent No.: US 10,003,100 B2
(45) Date of Patent: Jun. 19, 2018

(54) NONAQUEOUS ELECTROLYTE WITH FLUORINE CONTAINING ETHER COMPOUND FOR LITHIUM SECONDARY BATTERY

(71) Applicant: NEC Corporation, Tokyo (JP)

(72) Inventors: Takehiro Noguchi, Tokyo (JP); Makiko Uehara, Tokyo (JP)

(73) Assignee: NEC Corporation, Tokyo (JP)

( * ) Notice: Subject to any disclaimer, the term of this patent is extended or adjusted under 35 U.S.C. 154(b) by 125 days.

(21) Appl. No.: 14/376,224

(22) PCT Filed: Jan. 16, 2013

(86) PCT No.: PCT/JP2013/050643
§ 371 (c)(1),
(2) Date: Aug. 1, 2014

(87) PCT Pub. No.: WO2013/114946
PCT Pub. Date: Aug. 8, 2013

(65) Prior Publication Data
US 2015/0010831 A1 Jan. 8, 2015

(30) Foreign Application Priority Data

Feb. 3, 2012 (JP) .................... 2012-022085

(51) Int. Cl.
*H01M 10/0567* (2010.01)
*H01M 4/505* (2010.01)
(Continued)

(52) U.S. Cl.
CPC ....... *H01M 10/0567* (2013.01); *H01M 4/131* (2013.01); *H01M 4/136* (2013.01);
(Continued)

(58) Field of Classification Search
CPC .. H01M 4/505; H01M 4/485; H01M 10/0567; H01M 10/0569; H01M 4/5825;
(Continued)

(56) References Cited

U.S. PATENT DOCUMENTS

| 5,916,708 A | 6/1999 | Besenhard et al. |
| 6,566,015 B1 * | 5/2003 | Yamada ............... C07D 295/02 |
| | | 429/199 |
| 2007/0054186 A1 * | 3/2007 | Costello ............ H01M 10/0569 |
| | | 429/200 |

FOREIGN PATENT DOCUMENTS

| JP | 8-183854 | 7/1996 |
| JP | 10-112334 | 4/1998 |

(Continued)

OTHER PUBLICATIONS

Xu et al. "Nonflammable Electrolytes for Li-Ion Batteries Based on a Fluorinated Phosphate." Journal of the Electrochemical Society, 149 (8) A1079-A1082 (2002), available Jul. 2002.*
(Continued)

*Primary Examiner* — Michael L Dignan
(74) *Attorney, Agent, or Firm* — Finnegan, Henderson, Farabow, Garrett & Dunner, L.L.P.

(57) ABSTRACT

A lithium secondary battery including a positive electrode including a positive electrode active material capable of intercalating and deintercalating lithium ions, a negative electrode including a negative electrode active material capable of intercalating and deintercalating lithium ions, and a nonaqueous electrolytic solution, wherein the positive electrode active material includes an active material capable of intercalating or deintercalating lithium ions at a potential of 4.5 V or more, and the nonaqueous electrolytic solution includes a particular fluorine-containing ether compound.

16 Claims, 1 Drawing Sheet

(51) Int. Cl.
*H01M 10/052* (2010.01)
*H01M 10/0569* (2010.01)
*H01M 4/58* (2010.01)
*H01M 4/131* (2010.01)
*H01M 4/1315* (2010.01)
*H01M 4/136* (2010.01)
*H01M 4/485* (2010.01)
*H01M 4/50* (2010.01)
*H01M 4/52* (2010.01)
*H01M 4/525* (2010.01)
*H01M 10/0525* (2010.01)
*H01M 4/02* (2006.01)

(52) U.S. Cl.
CPC ......... *H01M 4/1315* (2013.01); *H01M 4/485* (2013.01); *H01M 4/502* (2013.01); *H01M 4/505* (2013.01); *H01M 4/523* (2013.01); *H01M 4/525* (2013.01); *H01M 4/5825* (2013.01); *H01M 10/052* (2013.01); *H01M 10/0525* (2013.01); *H01M 10/0569* (2013.01); *H01M 2004/028* (2013.01); *H01M 2220/30* (2013.01); *H01M 2300/0028* (2013.01); *H01M 2300/0034* (2013.01); *H01M 2300/0037* (2013.01)

(58) Field of Classification Search
CPC .. H01M 10/0525; H01M 4/525; H01M 4/523; H01M 4/502; H01M 4/136; H01M 4/1315; H01M 4/131; H01M 10/052; H01M 2220/30; H01M 2004/028; H01M 2300/0037; H01M 2300/0034; H01M 2300/0028
See application file for complete search history.

(56) References Cited

FOREIGN PATENT DOCUMENTS

| | | |
|---|---|---|
| JP | 2001-23691 | 1/2001 |
| JP | 2001-256995 | 9/2001 |
| JP | 2001-283903 A | 10/2001 |
| JP | 3304187 | 7/2002 |
| JP | 2004-47404 | 2/2004 |
| JP | 2004-363031 | 12/2004 |
| JP | 2006-216361 | 8/2006 |
| JP | 2008-521161 A | 6/2008 |
| JP | 2009-508304 | 2/2009 |
| JP | 2011-187234 | 9/2011 |
| WO | WO 2010/013739 A1 | 2/2010 |

OTHER PUBLICATIONS

Xiang et al. "Nonflammable electrolyte for 3-V lithium-ion battery with spinel LiNi0.5Mn1.5O4 materials and Li4Ti5O12." Journal of Power Sources 179 (2008) 351-356, available Jan. 2008.*
International Search Report dated Apr. 2, 2013.
Japanese Office Action issued by the Japanese Patent in counterpart Japanese Patent Application No. 2013-556299 dated Dec. 20, 2016.

* cited by examiner

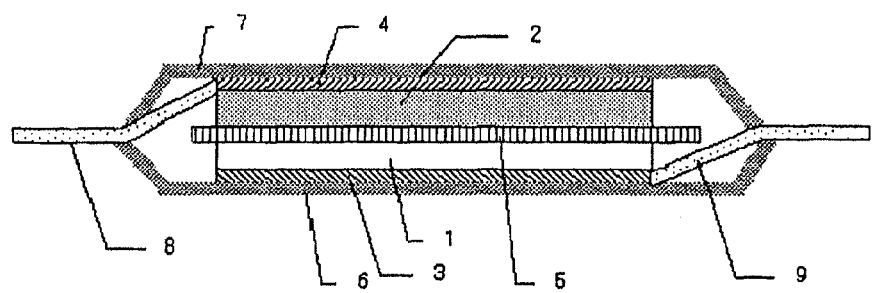

NONAQUEOUS ELECTROLYTE WITH FLUORINE CONTAINING ETHER COMPOUND FOR LITHIUM SECONDARY BATTERY

CROSS-REFERENCE TO RELATED PATENT APPLICATIONS

This application is a National Stage Entry of International Application No, PCT/JP2013/050643, filed Jan. 16, 2013, which claims priority from Japanese Patent Application No. 2012-022085, filed Feb. 3, 2012. The entire contents of the above-referenced applications are expressly incorporated herein by reference.

TECHNICAL FIELD

The present invention relates to a lithium secondary battery.

BACKGROUND ART

Lithium secondary batteries are widely utilized in portable electronic equipment, personal computers, and the like. Miniaturization and weight reduction are required of the lithium secondary batteries, and on the other hand, increasing the energy density is an important issue.

Various methods for increasing the energy density of a lithium secondary battery are studied, and among them, increasing the operating voltage of a battery is effective. A lithium secondary battery using lithium cobaltate or lithium manganate as a positive electrode active material has an average operating voltage of 3.6 to 3.8 V (4 V class) versus metal lithium. This is because the operating voltage is defined by the oxidation-reduction reaction of cobalt ions or manganese ions ($Co^{3+}$<-->$Co^{4+}$ or $Mn^{3+}$<-->$Mn^{4+}$).

On the other hand, a spinel compound obtained by replacing part of manganese in lithium manganate by nickel or the like, specifically $LiNi_{0.5}Mm_{1.5}O_4$, shows a potential plateau in a region of 4.5 V or more. Therefore, by using such a spinel compound as a positive electrode active material, higher (5 V class) operating voltage can be achieved. In a positive electrode using this spinel compound, manganese is present in the tetravalent state, and the operating voltage of the battery is defined by the oxidation-reduction of $Ni^{2+}$<-->$Ni^{4+}$ instead of the oxidation-reduction of $Mn^{3+}$<-->$Mn^{4+}$.

$LiNi_{0.5}Mn_{1.5}O_4$ has a capacity of 130 mAh/g or more and an average operating voltage of 4.6 V or more versus metal lithium, and has smaller lithium intercalation capacity than $LiCoO_2$ but has higher energy density than $LiCoO_2$. For such a reason, the spinel compound, such as $LiNi_{0.5}Mn_{1.5}O_4$, is promising as a positive electrode material.

On the other hand, various fluorine-containing ether compounds are used as materials of electrolytic solutions and ion conductors for secondary batteries.

Patent Literature 1 describes a problem in which when an electrolytic solution used so far is used in a battery having a voltage of 4 V or more, the charge and discharge cycle life shortens, and describes, as means for solving this, an electrolytic solution for a lithium secondary battery containing a particular organic fluorinated ether compound as a solvent.

Patent Literature 2 describes a particular fluorine-containing polyether having excellent conductivity, film formation properties, and mechanical strength, useful as an ion conductor thin film material for a lithium battery.

Patent Literature 3 describes a problem in which in a secondary battery using an organic solvent as the solvent of an electrolytic solution, the load characteristics (capacity retention rate) decrease with an increase in the number of charge and discharge cycles, and describes, as means for solving this, a secondary battery using an organic electrolytic solution containing a particular fluorine-containing polymer ether.

Patent Literature 4 describes a problem in which when an electrolytic solution having high viscosity is used in a nonaqueous electrolytic solution secondary battery, the internal resistance of the battery increases because of low lithium ion mobility, and the output characteristics decrease, and describes, as means for solving this, adding particular glycol diethers (those in which at least one hydrogen atom is replaced by a fluorine atom) to the electrolytic solution.

It is described in Patent Literature 5 that it is an object to provide a nonaqueous electrolytic solution secondary battery which has excellent initial efficiency and low temperature discharge characteristics and in which the amount of gas generated after high temperature storage is reduced, and as means for solving this, a nonaqueous electrolytic solution containing a particular fluorine-substituted ether and a monofluorophosphate and/or a difluorophosphate is used.

Patent Literature 6 describes, for a nonaqueous electrolytic solution secondary battery, the problem of swelling and capacity decrease when the battery was left in a high temperature environment, and describes, as means for solving this, adding vinylene carbonate and a fluorinated chain ether (for example, a fluorinated diether) to an electrolytic solution containing a chain carbonate-based compound.

On the other hand, Patent Literature 7 describes, as a negative electrode material for manufacturing a nonaqueous electrolyte secondary battery having high cycling properties, a conductive silicon composite obtained by coating with carbon the surface of a particle having a structure in which silicon microcrystals are dispersed in a silicon-based compound (silicon dioxide).

CITATION LIST

Patent Literature

Patent Literature 1: JP3304187B
Patent Literature 2: JP08-183854A
Patent Literature 3: JP10-112334A
Patent Literature 4: JP2001-023691A
Patent Literature 5: JP2011-187234A
Patent Literature 6: JP2004-363031A
Patent Literature 7: JP2004-47404A

SUMMARY OF INVENTION

Technical Problem

In a battery using a high potential positive electrode active material, such as $LiNi_{0.5}Mn_{1.5}O_4$, higher operating voltage than that of batteries using other positive electrode active materials, such as $LiCoO_2$ and $LiMn_2O_4$, is obtained, but the decomposition reaction of the electrolytic solution proceeds easily in the contact portion between the positive electrode and the electrolytic solution. Gas is generated by this decomposition reaction, and therefore, in cycle operation, the internal pressure of the cell increases and the swelling of the laminate cell occurs to cause problems in actual use.

As the solvent of a nonaqueous electrolytic solution, a carbonate-based material is mainly used. During the high voltage operation and long-term high temperature operation of a battery using such a nonaqueous electrolytic solution, gas generation accompanying the decomposition of the electrolytic solution in the cell is significant, as described above.

It is an object of the present invention to provide a high energy density lithium secondary battery having excellent life characteristics.

Solution to Problem

According to one aspect of the present invention, there is provided a lithium secondary battery including a positive electrode including a positive electrode active material capable of intercalating and deintercalating lithium ions, a negative electrode including a negative electrode active material capable of intercalating and deintercalating lithium ions, and a nonaqueous electrolytic solution, wherein the positive electrode active material includes an active material capable of intercalating or deintercalating lithium ions at a potential of 4.5 V or more, and the nonaqueous electrolytic solution includes a fluorine-containing ether compound represented by the following general formula (1):

[Formula 1]

$$C_{m1}H_{2m1+1-n1}F_{n1}O-(C_{m2}H_{2m2-n2}F_{n2}O)p-(C_{m3}H_{2m3-n3}F_{n3}O)q-(C_{m4}H_{2m4-n4}F_{n4}O)r-C_{m5}H_{2m5+1-n5}F_{n5} \quad (1)$$

wherein m1 to m5 are each independently a natural number of 1 to 5, p, q, and r are each independently 0 or a natural number and satisfy $1 \leq p+q+r \leq 3$, and n1 to n5 each independently represent a natural number.

Advantageous Effect of Invention

According to an exemplary embodiment, a high density lithium secondary battery in which internal gas generation is suppressed and which has excellent life characteristics can be provided.

BRIEF DESCRIPTION OF DRAWING

FIG. 1 is a diagram showing the cross-sectional structure of a secondary battery according to an exemplary embodiment of the present invention.

DESCRIPTION OF EMBODIMENT

In a lithium secondary battery according to an exemplary embodiment of the present invention, the positive electrode includes a positive electrode active material capable of intercalating or deintercalating lithium ions at a potential of 4.5 V or more versus lithium metal, and the nonaqueous electrolytic solution contains a particular fluorine-containing ether compound represented by the above general formula (1).

By using an electrolytic solution containing such a fluorine-containing ether compound, a secondary battery having improved life characteristics while using a high potential positive electrode material can be provided. Particularly, gas generation due to the decomposition of the electrolytic solution caused by the high potential positive electrode material can be suppressed, and defects due to an increase in the internal pressure of the cell and the swelling of the cell accompanying gas generation can be prevented. In addition, the low temperature characteristics can also be improved.

The fluorine-containing ether compound represented by the above general formula (1) has two or more ether groups ($1 \leq p+q+r$). Thus, there is a tendency that the boiling point of the nonaqueous electrolytic solution increases and the melting point decreases, and therefore, the temperature range in which the secondary battery can operate can be widened.

In formula (1), the total number of alkylene groups between ether bonds (that is, the number of alkylene ether units) is 3 or less ($p+q+r \leq 3$), preferably 2 or less ($p+q+r \leq 2$). When the number of alkylene groups is small, an increase in the viscosity of the electrolytic solution can be suppressed.

In formula (1), the number of carbon atoms of the alkyl group at the molecular end (m1, m5) and the number of carbon atoms of the alkylene group between the ether bonds (m2, m3, m4) are each independently preferably 1 or more and 5 or less, more preferably 1 or more and 4 or less. When the number of carbon atoms of these is 5 or less, an increase in the viscosity of the electrolytic solution is suppressed, and the electrolytic solution easily penetrates into the pores in the electrodes and the separator, and at the same time, the ionic conductivity is improved, and the current value in the charge and discharge characteristics of the battery can be made good.

In formula (1), the alkylene groups between the ether bonds and the alkyl groups at the molecular ends each have a fluorine atom (n1 to n5 are each a natural number). Thus, the oxidation resistance can be increased, and gas generation can be suppressed. These alkylene groups and alkyl groups at the molecular ends each preferably have two or more fluorine atoms (n1 to n5 are each 2 or more). When the content of fluorine atoms is high, the voltage endurance is further improved, and the generation of gas in the cell can be further suppressed. Particularly, it is more preferred that all hydrogen atoms of the alkylene groups between the ether bonds are replaced by fluorine atoms (n2=2m2, n3=2m3, n4=2m4). Further, when the number of carbon atoms of the alkylene group is large, the number of fluorine atoms is also large, and therefore, the number of carbon atoms of the alkylene group (m2, m3, m4) is preferably 3 or more.

The content of the fluorine-containing ether compound of general formula (1) included in the nonaqueous electrolytic solution is not particularly limited and is preferably 1 to 40% by volume in the solvent (including the fluorine-containing ether compound represented by formula (1)) forming the nonaqueous electrolytic solution. When this content is 1% by volume or more, the voltage endurance can be increased, and therefore, the effect of suppressing gas generation is improved. When this content is 40% by volume or less, the ionic conductivity of the nonaqueous electrolytic solution can be increased, and therefore, the charge and discharge rate of the battery is better. From such a viewpoint, this content is more preferably 2% by volume or more, further preferably 5% by volume or more, and is more preferably 30% by volume or less, further preferably 20% by volume or less.

Examples of the fluorine-containing ether compound represented by general formula (1) include the following compounds:

2H-perfluoro-5-methyl-3,6-dioxanonane:

CF$_3$CHF—O—(CF$_2$CF(CF$_3$)O)—C$_3$F$_7$;

2H-perfluoro-5,8-dimethyl-3,6,9-trioxadodecane:

CF$_3$CHF—O—(CF$_2$CF(CF$_3$)O)$_2$—C$_3$F$_7$;

perfluorodiglyme:

CF$_3$—O—(CF$_2$CF$_2$O)$_2$—C$_3$F$_7$;

perfluorotriglyme:

CF$_3$—O—(CF$_2$CF$_2$O)$_3$—C$_3$F$_7$;

Among the fluorine-containing ether compounds represented by general formula (1), in terms of the effect of suppressing electrolytic solution decomposition at high potential, compounds represented by the following general formula (2):
[Formula 2]

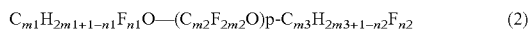
$$C_{m1}H_{2m1+1-n1}F_{n1}O-(C_{m2}F_{2m2}O)p-C_{m3}H_{2m3+1-n2}F_{n2} \quad (2)$$

wherein m1, m2, and m3 each independently represent a natural number of 1 to 5, p represents 1 or 2, and n1 and n2 each independently represent a natural number, are preferred. In formula (2), n1 and n2 are each preferably 2 or more, and m1, m2, and m3 are each preferably 4 or less, and particularly, m2 is preferably 3 or 4. As the compounds represented by formula (1) and further formula (2), particularly, 2H-perfluoro-5-methyl-3,6-dioxanonane ($CF_3CHF-O-(CF_2CF(CF_3)O)-C_3F_7$) and 2H-perfluoro-5,8-dimethyl-3,6,9-trioxadodecane ($CF_3CHF-O-(CF_2CF(CF_3)O)_2-C_3F_7$) are preferred.

One of the fluorine-containing ether compounds shown above can be used alone, or two or more of the fluorine-containing ether compounds can be used in combination.

As a solvent component of the nonaqueous electrolytic solution, a fluorine-containing organic solvent, such as a fluorine-containing phosphate compound, is preferably further contained. The content of the fluorine-containing organic solvent, such as a fluorine-containing phosphate compound, included in the nonaqueous electrolytic solution is not particularly limited and is preferably 5% by volume or more, more preferably 10% by volume or more, and further preferably 20% by volume or more, and preferably 80% by volume or less, more preferably 70% by volume or less, and further preferably 60% by volume or less, in the solvent (including the fluorine-containing ether compound represented by formula (1)) forming the nonaqueous electrolytic solution. By adding the fluorine-containing organic solvent (particularly a fluorine-containing phosphate compound), the oxidation resistance of the nonaqueous electrolytic solution can be increased, and the compatibility of the solvent component can be increased.

As a solvent component of the nonaqueous electrolytic solution, a cyclic carbonate compound is preferably further contained. The cyclic carbonate compound has a large relative dielectric constant, and therefore, by adding the cyclic carbonate compound, the ionic conductivity of the nonaqueous electrolytic solution can be increased. The content of the cyclic carbonate compound included in the nonaqueous electrolytic solution is not particularly limited and is preferably 5% by volume or more, more preferably 10% by volume or more, and more preferably 20% by volume or more, and preferably 60% by volume or less, more preferably 50% by volume or less, and further preferably 40% by volume or less, in the solvent (including the fluorine-containing ether compound represented by formula (1)) forming the nonaqueous electrolytic solution.

From the viewpoint of dielectric constant, viscosity, compatibility, gas generation suppression, and the like, a solvent containing a cyclic carbonate compound, a fluorine-containing organic solvent (for example, a fluorine-containing phosphate compound), and a fluorine-containing ether compound represented by formula (1) is preferably used. In this case, the content of each of these components based on the total amount of the solvent including these is preferably set as follows. The content of the cyclic carbonate compound is preferably set to 5 to 60% by volume, the content of the fluorine-containing organic solvent (for example, a fluorine-containing phosphate compound) is preferably set to 5 to 80% by volume, and the content of the fluorine-containing ether compound represented by formula (1) is preferably set to 1 to 40% by volume. In addition, the content of the cyclic carbonate compound is more preferably set to 10 to 60% by volume, the content of the fluorine-containing organic solvent (for example, a fluorine-containing phosphate compound) is more preferably set to 10 to 70% by volume, and the content of the fluorine-containing ether compound represented by formula (1) is more preferably set to 5 to 30% by volume. Further, the content of the cyclic carbonate compound can be set to 20 to 50% by volume, the content of the fluorine-containing organic solvent (for example, a fluorine-containing phosphate compound) can be set to 30 to 60% by volume, and the content of the fluorine-containing ether compound represented by formula (1) can be set to 5 to 20% by volume. The cyclic carbonate compound may be fluorinated. Other solvent components described later may be added as required.

Examples of the above fluorine-containing organic solvent include fluorine-containing phosphate compounds, fluorine-containing chain carbonate compounds, fluorine-containing ether compounds (fluorine-containing chain ether compounds and fluorine-containing cyclic ether compounds) other than the fluorine-containing ether compounds represented by formula (1), and fluorine-containing carboxylate compounds (fluorine-containing chain carboxylate compounds and fluorine-containing cyclic carboxylate compounds). Fluorine-containing phosphate compounds are particularly preferred.

Examples of other solvent components include compounds containing no fluorine such as chain carbonate compounds, chain ether compounds, cyclic ether compounds, chain carboxylate compounds, cyclic carboxylate compounds, and phosphate compounds.

The cyclic carbonate compound has a large relative dielectric constant, and therefore, by containing it in the nonaqueous electrolytic solution, the dissociation properties of the supporting salt are improved, and sufficient conductivity is easily obtained. Further, by using the cyclic carbonate compound and other solvent components, such as a chain carbonate compound (including a fluorinated product), a fluorinated ether compound, and a fluorinated carboxylate compound, in combination, the viscosity of the nonaqueous electrolytic solution can be lowered, and therefore, the ion mobility in the nonaqueous electrolytic solution can be improved. In addition, a cyclic carbonate compound (including a fluorinated product), a fluorinated chain carbonate compound, a fluorinated ether compound, a fluorinated carboxylate compound, a fluorinated carbonate compound, and a fluorine-containing phosphate compound have high voltage endurance and conductivity and therefore are suitable for use in combination with the fluorine-containing ether compound represented by general formula (1).

The cyclic carbonate compound used as a solvent component of the nonaqueous electrolytic solution is not particularly limited. Examples thereof can include ethylene carbonate (EC), propylene carbonate (PC), butylene carbonate (BC), or vinylene carbonate (VC). In addition, the cyclic carbonate compound includes a fluorinated cyclic carbonate compound. Examples of the fluorinated cyclic carbonate compound can include compounds obtained by replacing some or all hydrogen atoms of ethylene carbonate (EC), propylene carbonate (PC), butylene carbonate (BC), vinylene carbonate (VC), or the like by fluorine atoms. Examples thereof include 4-fluoro-1,3-dioxolan-2-one, (cis or trans)4,5-difluoro-1,3-dioxolan-2-one, 4,4-difluoro-1,3-dioxolan-2-one, and 4-fluoro-5-methyl-1,3-dioxolan-2-one.

Among these, from the viewpoint of voltage endurance and conductivity, ethylene carbonate, propylene carbonate, or compounds obtained by fluorinating these partly, or the like is preferred, and ethylene carbonate is more preferred. One cyclic carbonate compound can be used alone, or two or more cyclic carbonate compounds can be used in combination.

The content of the cyclic carbonate compound is preferably 5 to 70% by volume, more preferably 10 to 60% by volume, and further preferably 20 to 50% by volume, in the solvent forming the nonaqueous electrolytic solution from the viewpoint of the effect of increasing the degree of dissociation of the supporting salt, and the effect of increasing the conductivity of the electrolytic solution.

The chain carbonate compound used as a solvent component of the nonaqueous electrolytic solution is not particularly limited. Examples thereof can include dimethyl carbonate (DMC), ethyl methyl carbonate (EMC), diethyl carbonate (DEC), and dipropyl carbonate (DPC). In addition, as the chain carbonate compound, a fluorinated chain carbonate compound can be used. Examples of the fluorinated chain carbonate compound can include compounds obtained by replacing some or all hydrogen atoms of ethyl methyl carbonate (EMC), dimethyl carbonate (DMC), diethyl carbonate (DEC), dipropyl carbonate (DPC), and the like by fluorine atoms. Examples thereof include bis(fluoroethyl) carbonate, 3-fluoropropyl methyl carbonate, and 3,3,3-trifluoropropyl methyl carbonate. Among these, dimethyl carbonate is preferred from the viewpoint of voltage endurance and conductivity. One chain carbonate compound can be used alone, or two or more chain carbonate compounds can be used in combination.

The content of the chain carbonate compound can be appropriately set in the range of 5 to 80% by volume in the solvent forming the nonaqueous electrolytic solution from the viewpoint of the effect of lowering the viscosity of the nonaqueous electrolytic solution, and the effect of increasing the dielectric constant, and is more preferably 10% by volume or more from the viewpoint of obtaining a sufficient addition effect, and is more preferably 70% by volume or less, further preferably 60% by volume or less, in terms of obtaining a sufficient blending effect with other solvents.

The carboxylate compound used as a solvent component of the nonaqueous electrolytic solution is not particularly limited. Examples thereof include ethyl acetate, methyl propionate, ethyl formate, ethyl propionate, methyl butyrate, ethyl butyrate, methyl acetate, and methyl formate. In addition, as the carboxylate compound, a fluorinated carboxylate can be used. Examples of the fluorinated carboxylate compound include compounds obtained by replacing some or all hydrogen atoms of ethyl acetate, methyl propionate, ethyl formate, ethyl propionate, methyl butyrate, ethyl butyrate, methyl acetate, or methyl formate by fluorine atoms. Examples thereof include ethyl pentafluoropropionate, ethyl 3,3,3-trifluoropropionate, methyl 2,2,3,3-tetrafluoropropionate, 2,2-difluoroethyl acetate, methyl heptafluoroisobutyrate, methyl 2,3,3,3-tetrafluoropropionate, methyl pentafluoropropionate, methyl 2-(trifluoromethyl)-3,3,3-trifluoropropionate, ethyl heptafluorobutyrate, methyl 3,3,3-trifluoropropionate, 2,2,2-trifluoroethyl acetate, isopropyl trifluoroacetate, tert-butyl trifluoroacetate, ethyl 4,4,4-trifluorobutyrate, methyl 4,4,4-trifluorobutyrate, butyl 2,2-difluoroacetate, ethyl difluoroacetate, n-butyl trifluoroacetate, 2,2,3,3-tetrafluoropropyl acetate, ethyl 3-(trifluoromethyl) butyrate, methyl tetrafluoro-2-(methoxy)propionate, 3,3, 3trifluoropropyl 3,3,3-trifluoropropionate, methyl difluoroacetate, 2,2,3,3-tetrafluoropropyl trifluoroacetate, 1H,1H-heptafluorobutyl acetate, methyl heptafluorobutyrate, and ethyl trifluoroacetate. Among these, ethyl propionate, methyl acetate, methyl 2,2,3,3-tetrafluoropropionate, 2,2,3, 3-tetrafluoropropyl trifluoroacetate, and the like are preferred from the viewpoint of voltage endurance, the boiling point, and the like. The carboxylate compound is effective in reducing the viscosity of the electrolytic solution like the chain carbonate compound. Therefore, the carboxylate compound can be used instead of the chain carbonate compound and can also be used in combination with the chain carbonate compound.

The content of the carboxylate compound can be appropriately set in the range of 0.1 to 50% by volume in the solvent forming the nonaqueous electrolytic solution, and is more preferably 0.2% by volume or more, further preferably 0.5% by volume or more, from the viewpoint of obtaining a sufficient addition effect, and is more preferably 20% by volume or less, further preferably 15% by volume or less, in terms of obtaining a sufficient blending effect with other solvents. By containing the carboxylate compound, the low temperature characteristics can be further improved, and the conductivity can be further improved. In addition, by reducing the content of the carboxylate compound, an increase in vapor pressure when the battery is left at high temperature can be reduced.

The chain ether compound used as a solvent component of the nonaqueous electrolytic solution is not particularly limited. Examples thereof include 1,2-ethoxyethane (DEE) and ethoxymethoxyethane (EME). In addition, a fluorinated chain ether compound obtained by replacing part of the hydrogen of a chain ether compound by fluorine has high oxidation resistance and is preferred for a battery including a positive electrode operating at high potential. Examples of the fluorinated chain ether compound include 2,2,3,3,3-pentafluoropropyl 1,1,2,2-tetrafluoroethyl ether, 1,1,2,2-tetrafluoroethyl 2,2,2-trifluoroethyl ether, 1H,1H,2'H,3H-decafluorodipropyl ether, 1,1,1,2,3,3-hexafluoropropyl-2,2-difluoroethyl ether, isopropyl 1,1,2,2-tetrafluoroethyl ether, propyl 1,1,2,2-tetrafluoroethyl ether, 1,1,2,2-tetrafluoroethyl 2,2,3,3-tetrafluoropropyl ether, 1H,1H,5H-perfluoropentyl-1,1,2,2-tetrafluoroethyl ether, 1H,1H,2'H-perfluorodipropyl ether, 1H-perfluorobutyl-1H-perfluoroethyl ether, methyl perfluoropentyl ether, methyl perfluorohexyl ether, methyl 1,1,3,3,3-pentafluoro-2-(trifluoromethyl)propyl ether, 1,1,2, 3,3,3-hexafluoropropyl 2,2,2-trifluoroethyl ether, ethyl nonafluorobutyl ether, ethyl 1,1,2,3,3,3-hexafluoropropyl ether, 1H,1H,5H-octafluoropentyl 1,1,2,2-tetrafluoroethyl ether, 1H,1H,2'H-perfluorodipropyl ether, heptafluoropropyl 1,2,2, 2-tetrafluoroethyl ether, 1,1,2,2-tetrafluoroethyl-2,2,3,3-tetrafluoropropyl ether, 2,2,3,3,3-pentafluoropropyl-1,1,2,2-tetrafluoroethyl ether, ethyl nonafluorobutyl ether, and methyl nonafluorobutyl ether. The chain ether compound can be appropriately selected from the viewpoint of voltage endurance, the boiling point, and the like. The chain ether compound is effective in reducing the viscosity of the electrolytic solution like the chain carbonate compound. Therefore, for example, the chain ether compound can be used instead of the chain carbonate compound and the carboxylate compound and can also be used in combination with the chain carbonate compound and the carboxylate compound.

The content of the chain ether compound can be appropriately set in the range of 0.1 to 70% by volume in the solvent forming the nonaqueous electrolytic solution, and is more preferably 0.2% by volume or more, further preferably 0.5% by volume or more, from the viewpoint of obtaining a sufficient addition effect, and is more preferably 60% by volume or less, further preferably 50% by volume or less, in terms of obtaining a sufficient blending effect with other solvents. By containing the chain ether compound, the low temperature characteristics can be further improved, and the conductivity can be further improved. In addition, by reducing the content of the chain ether compound, the compatibility of the electrolytic solution can be increased, and the battery characteristics can be stably obtained.

Examples of the phosphate compound used as a solvent component of the nonaqueous electrolytic solution include trimethyl phosphate, triethyl phosphate, and tributyl phosphate. Examples of the fluorine-containing phosphate compound include 2,2,2-trifluoroethyl dimethyl phosphate, bis(trifluoroethyl) methyl phosphate, bis(trifluoroethyl) ethyl phosphate, tris(trifluoromethyl) phosphate, pentafluoropropyl dimethyl phosphate, heptafluorobutyl dimethyl phosphate, trifluoroethyl methyl ethyl phosphate, pentafluoropropyl methyl ethyl phosphate, heptafluorobutyl methyl ethyl phosphate, trifluoroethyl methyl propyl phosphate, pentafluoropropyl methyl propyl phosphate, heptafluorobutyl methyl propyl phosphate, trifluoroethyl methyl butyl phosphate, pentafluoropropyl methyl butyl phosphate, heptafluorobutyl methyl butyl phosphate, trifluoroethyl diethyl phosphate, pentafluoropropyl diethyl phosphate, heptafluorobutyl diethyl phosphate, trifluoroethyl ethyl propyl phosphate, pentafluoropropyl ethyl propyl phosphate, heptafluorobutyl ethyl propyl phosphate, trifluoroethyl ethyl butyl phosphate, pentafluoropropyl ethyl butyl phosphate, heptafluorobutyl ethyl butyl phosphate, trifluoroethyl dipropyl phosphate, pentafluoropropyl dipropyl phosphate, heptafluorobutyl dipropyl phosphate, trifluoroethyl propyl butyl phosphate, pentafluoropropyl propyl butyl phosphate, heptafluorobutyl propyl butyl phosphate, trifluoroethyl dibutyl phosphate, pentafluoropropyl dibutyl phosphate, heptafluorobutyl dibutyl phosphate, tris(2,2,3,3-tetrafluoropropyl) phosphate, tris(2,2,3,3,3-pentafluoropropyl) phosphate, tris(2,2,2-trifluoroethyl)phosphate, tris(1H,1H-heptafluorobutyl) phosphate, and tris(1H,1H,5H-octafluoropentyl)phosphate. Among these, from the viewpoint of the effect of suppressing electrolytic solution decomposition at high potential, compatibility, and the like, fluorine-containing phosphate compounds are preferred, fluorinated phosphates represented by the following formula:

$O=P(OR)_3$ wherein R each independently represents an alkyl group or a fluoroalkyl group having 1 to 5 carbon atoms, and at least one R is a fluoroalkyl group, are more preferred, and further fluorinated phosphates represented by the following formula:

$O=P(OCH_2Ra)_3$ wherein Ra represents a fluoroalkyl group having 1 to 4 carbon atoms, are particularly preferred. Three Ra in the formula are each preferably the same fluoroalkyl group. Ra in the formula preferably has 1 to 3 carbon atoms. In addition, it is preferred that in Ra, at least one fluorine atom is bonded to each carbon atom. Among these fluorine-containing phosphate compounds, tris(2,2,2-trifluoroethyl) phosphate is particularly preferred.

One of the phosphate compounds shown above can be used alone, or two or more of the phosphate compounds can be used in combination.

The nonaqueous electrolytic solution may contain other components other than the above. Examples of the other components include γ-lactones, such as γ-butyrolactone; and cyclic ethers, such as tetrahydrofuran and 2-methyltetrahydrofuran. In addition, examples of the other components include aprotic organic solvents, such as dimethyl sulfoxide, 1,3-dioxolane, acetamide, dimethylformamide, dioxolane, acetonitrile, propylnitrile, nitromethane, ethyl monoglyme, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propanesultone, anisole, and N-methylpyrrolidone.

The total content of the cyclic carbonate, the above fluorine-containing organic solvent, and the fluorine-containing ether compound represented by formula (1) in the entire solvent is preferably 80% by volume or more, more preferably 90% by volume or more.

Examples of the supporting salt included in the nonaqueous electrolytic solution include lithium salts, such as $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_2$, $LiN(CF_3SO_2)_2$, $LiN(C_2F_5SO_2)_2$, and $LiB_{10}Cl_{10}$. Examples of other supporting salts include lower aliphatic lithium carboxylate carboxylates, chloroborane lithium, lithium tetraphenylborate, LiBr, LiI, LiSCN, and LiCl. One supporting salt can be used alone, or two or more supporting salts can be used in combination.

An ion-conducting polymer can be added to the nonaqueous electrolytic solution. Examples of the ion-conducting polymer include polyethers, such as polyethylene oxide and polypropylene oxide; and polyolefins, such as polyethylene and polypropylene, and can further include polyvinylidene fluoride, polytetrafluoroethylene, polyvinyl fluoride, polyvinyl chloride, polyvinylidene chloride, polymethyl methacrylate, polymethyl acrylate, polyvinyl alcohol, polymethacrylonitrile, polyvinyl acetate, polyvinylpyrrolidone, polycarbonates, polyethylene terephthalate, polyhexamethylene adipamide, polycaprolactam, polyurethanes, polyethylenimine, polybutadiene, polystyrene, or polyisoprene, or derivatives thereof. One ion-conducting polymer can be used alone, or two or more ion-conducting polymers can be used in combination. In addition, polymers containing various monomers forming the above polymers may be used.

(Positive Electrode)

The positive electrode of the lithium secondary battery according to this exemplary embodiment includes a positive electrode active material capable of intercalating or deintercalating lithium ions at a potential of 4.5 V or more versus lithium metal from the viewpoint of obtaining high energy density.

For this positive electrode active material, one in which at least the charge curve of its charge and discharge curves has a region of 4.5 V or more versus lithium metal at least in part can be used. In other words, an active material in which only the charge curve has a region of 4.5 V or more versus lithium metal at least in part, or an active material in which both the charge curve and the discharge curve have a region of 4.5 V or more versus lithium metal at least in part can be used.

As the measurement conditions of these charge and discharge curves, the charge and discharge current can be set to 5 mA/g per mass of the positive electrode active material, the charge termination voltage can be set to 5.2 V, and the discharge termination voltage can be set to 3 V.

Examples of such a positive electrode active material include spinel-based materials, layered materials, and olivine-based materials.

Examples of the spinel-based materials include materials operating at a high potential of 4.5 V or more versus lithium, such as $LiNi_{0.5}Mn_{1.5}O_4$, $LiCoMnO_4$, $LiCrMnO_4$, $LiFeMnO_4$, and $LiCu_{0.5}Mn_{1.5}O_4$; $LiM1_xMn_{2-x-y}M2_yO_4$ (M1 is at least one selected from Ni, Fe, Co, Cr, and Cu, 0.4<x<1.1 holds, M2 is at least one selected from Li, Al, B, Mg, Si, and transition metals, and 0<y<0.5) obtained by replacing part of the Mn of LiMn$_2$O$_4$ by other elements to increase life; and those obtained by replacing part of the oxygen of these materials by fluorine or chlorine.

For the spinel-based materials, particularly those represented by the following formula are preferred.

$$Li_a(M_xMn_{2-x-y}Y_y)(O_{4-w}Z_w)$$

wherein $0 \leq x \leq 1.2$, $0 \leq y$, $x+y<2$, $0 \leq a \leq 1.2$, and $0 \leq w \leq 1$ hold, M is at least one selected from Co, Ni, Fe, Cr, and Cu, Y is at least one selected from Li, B, Na, Al, Mg, Ti, Si, K, and Ca, and Z is at least one of F and Cl.

The layered materials are represented by the general formula LiMO$_2$. Specific examples thereof include LiCoO$_2$, materials represented by LiNi$_{1-x}$M$_x$O$_2$ (M is an element including at least Co or Al, and 0.05<x<0.3), and materials represented by Li(Ni$_x$Co$_y$Mn$_{2-x-y}$)O$_2$ (0.1<x<0.7, and 0<y<0.5). In addition, specific examples thereof include materials represented by Li(Li$_x$M$_{1-x-z}$Mn$_z$)O$_2$ (0≤x<0.3, 0.3≤z≤0.7, and M is at least one of Co and Ni) in which high capacity is obtained by charging at a high potential of 4.5 V or more versus lithium, and these materials are particularly preferred. x in the formula of these materials is preferably 0≤x<0.2.

The olivine-based materials are represented by the general formula LiMPO$_4$. Specific examples thereof include LiFePO$_4$, LiMnPO$_4$, LiCoPO$_4$, and LiNiPO4. Those obtained by replacing parts of the transition metals of these by another element or replacing the oxygen moiety by fluorine can also be used. From the viewpoint of high energy density, materials represented by LiMPO$_4$ (M is at least one of Co and Ni) operating at high potential are preferred.

In addition to these, a NASICON type, lithium transition metal silicon composite oxides, and the like can be used.

The above positive electrode active material operating at high potential and other usual positive electrode active materials may be used in combination. The content of the above positive electrode active material operating at high potential in the entire positive electrode active material is preferably 60% by mass or more, more preferably 80% by mass or more, and further preferably 90% by mass or more.

The specific surface area of these positive electrode active materials is, for example, 0.01 to 5 m$^2$/g, preferably 0.05 to 4 m$^2$/g, more preferably 0.1 to 3 m$^2$/g, and further preferably 0.2 to 2 m$^2$/g. By setting the specific surface area in such a range, the contact area with the electrolytic solution can be adjusted in an appropriate range. In other words, by setting the specific surface area to 0.01 m$^2$/g or more, the insertion and desorption of lithium ions are easily smoothly performed, and the resistance can be further reduced. In addition, by setting the specific surface area to 5 m$^2$/g or less, the acceleration of the decomposition of the electrolytic solution, and the dissolution of the constituent elements of the active material can be further suppressed. The specific surface area can be measured by a usual BET specific surface area measurement method.

The median particle diameter of the above positive electrode active material is preferably 0.01 to 50 μm, more preferably 0.02 to 40 μm. By setting the particle diameter to 0.02 μm or more, the dissolution of the constituent elements of the positive electrode active material can be further suppressed, and deterioration due to contact with the electrolytic solution can be further suppressed. In addition, by setting the particle diameter to 50 μm or less, the insertion and desorption of lithium ions are easily smoothly performed, and the resistance can be further reduced. The median particle diameter is a 50% cumulative diameter D$_{50}$ (median diameter) and can be measured by a laser diffraction scattering type particle size distribution measuring apparatus.

As the positive electrode binder, one similar to the negative electrode binder can be used. Especially, polyvinylidene fluoride is preferred from the viewpoint of versatility and low cost. The amount of the positive electrode binder used is preferably 2 to 10 parts by mass based on 100 parts by mass of the positive electrode active material from the viewpoint of binding force and energy density in a trade-off relationship.

Examples of binders other than polyvinylidene fluoride (PVdF) include vinylidene fluoride-hexafluoropropylene copolymers, vinylidene fluoride-tetrafluoroethylene copolymers, styrene-butadiene copolymerized rubbers, polytetrafluoroethylene, polypropylene, polyethylene, polyimides, and polyamideimides.

As the positive electrode current collector, for example, aluminum, nickel, silver, stainless steel (SUS), valve metals, or alloys thereof can be used from the viewpoint of electrochemical stability. Examples of its shape include foil, a flat plate shape, and a mesh shape. Particularly, aluminum foil can be preferably used.

A conductive auxiliary material may be added to the positive electrode material containing the positive electrode active material for the purpose of decreasing impedance. Examples of the conductive auxiliary material include carbonaceous fine particles, such as graphite, carbon black, and acetylene black.

The positive electrode can be made, for example, by preparing a slurry containing a positive electrode active material, a binder, and a solvent (and further a conductive auxiliary material as required), coating a positive electrode current collector with the slurry, drying it, and applying pressure as required, to form a positive electrode active material layer on the positive electrode current collector.

(Negative Electrode)

The negative electrode is not particularly limited as long as it contains as the negative electrode active material a material capable of intercalating and deintercalating lithium.

The negative electrode active material is not particularly limited as long as it is a material capable of reversibly intercalating and deintercalating lithium ions (a material that can intercalate lithium ions during charge and deintercalate lithium ions during discharge). Examples thereof include a carbon material (a) capable of intercalating and deintercalating lithium ions, a metal (b) capable of being alloyed with lithium, and a metal oxide (c) capable of intercalating and deintercalating lithium ions.

As the carbon material (a), graphite, amorphous carbon, diamond-like carbon, carbon nanotubes, or composites thereof can be used.

Graphite having high crystallinity has high electrical conductivity and has excellent adhesiveness to a positive electrode current collector made of a metal, such as copper, and excellent voltage flatness. On the other hand, in amorphous carbon having low crystallinity, the volume expansion is relatively small, and therefore, the effect of relieving the volume expansion of the entire negative electrode is large, and deterioration caused by nonuniformity, such as grain boundaries and defects, does not occur easily.

The carbon material (a) can be used alone or in combination with other active materials. When the carbon material (a) is used in combination with other active materials, its content can be appropriately set in the range of 2% by mass or more and 80% by mass or less in the negative electrode active material and can be preferably set in the range of 2% by mass or more and 30% by mass or less.

As the metal (b), Al, Si, Pb, Sn, Zn, Cd, Sb, In, Bi, Ag, Ba, Ca, Hg, Pd, Pt, Te, La, or alloys containing two or more of these, or alloys of these metals or alloys and lithium, or the like can be used. Particularly, as the metal (b), silicon (Si) or silicon-containing metals are preferred. The metal (b) can be used alone or in combination with other active materials. When the metal (b) is used in combination with other active materials, its content can be appropriately set in the range of 5% by mass or more and 90% by mass or less in the negative electrode active material and can be preferably set in the range of 20% by mass or more and 50% by mass or less.

As the metal oxide (c), silicon oxide, aluminum oxide, tin oxide, indium oxide, zinc oxide, lithium oxide, or composites containing two or more of these can be used. Particularly, the metal oxide (c) preferably contains silicon oxide. This is because silicon oxide is relatively stable and does not easily cause reactions with other compounds. In addition, one or two or more elements selected from among nitrogen, boron, and sulfur can also be added to the metal oxide (c), for example, in an amount of 0.1 to 5% by mass. By doing this, the electrical conductivity of the metal oxide (c) can be improved. The metal oxide (c) can be used alone or in combination with other active materials. When the metal oxide (c) is used in combination with other active materials, its content can be appropriately set in the range of 5% by mass or more and 90% by mass or less in the negative electrode active material and can be preferably set in the range of 40% by mass or more and 70% by mass or less.

Specific examples of the metal oxide (c) include $LiFe_2O_3$, $WO_2$, $MoO_2$, $SiO$, $SiO_2$, $CuO$, $SnO$, $SnO_2$, $Nb_3O_5$, $Li_xTi_{2-x}O_4$ ($1 \leq x \leq 4/3$), $PbO_2$, and $Pb_2O_5$.

Examples of other negative electrode active materials include a metal sulfide (d) capable of intercalating and deintercalating lithium ions. Examples of the metal sulfide (d) include $SnS$ and $FeS_2$. In addition, examples of the negative electrode active material can include metal lithium or lithium alloys, polyacene or polythiophene, or lithium nitride, such as $Li_5(Li_3N)$, $Li_7MnN_4$, $Li_3FeN_2$, $Li_{2.5}Co_{0.5}N$, or $Li_3CoN$.

The above negative electrode active materials can be used alone, or two or more of the above negative electrode active materials can be mixed and used.

When two or more negative electrode active materials are mixed and used, a negative electrode active material can be arranged to contain a carbon material (a), a metal (b), and a metal oxide (c). This negative electrode active material will be described below.

It is preferred that all or part of the metal oxide (c) has an amorphous structure. The metal oxide (c) having an amorphous structure can suppress the volume expansion of the carbon material (a) and the metal (b) and can suppress the decomposition of the electrolytic solution. This mechanism is presumed as follows. The fact that the metal oxide (c) is an amorphous structure has some influence on film formation at the interface between the carbon material (a) and the electrolytic solution. In addition, it is probably that in the amorphous structure, there are a relatively small number of factors caused by nonuniformity, such as grain boundaries and defects. The fact that all or part of the metal oxide (c) has an amorphous structure can be confirmed by X-ray diffraction measurement (general XRD measurement). Specifically, when the metal oxide (c) does not have an amorphous structure, a peak specific to the metal oxide (c) is observed, and when all or part of the metal oxide (c) has an amorphous structure, a broadened peak specific to the metal oxide (c) is observed.

The metal oxide (c) is preferably an oxide of the metal forming the metal (b). For example, the metal (b) and the metal oxide (c) are preferably silicon (Si) and silicon oxide (SiO), respectively.

It is preferred that all or part of the metal (b) is dispersed in the metal oxide (c). By dispersing at least part of the metal (b) in the metal oxide (c), volume expansion as the entire negative electrode can be further suppressed, and the decomposition of the electrolytic solution can also be suppressed. The fact that all or part of the metal (b) is dispersed in the metal oxide (c) can be confirmed by using transmission electron microscope observation (general TEM observation) and energy dispersive X-ray spectroscopy measurement (general EDX measurement) in combination. Specifically, a cross section of a sample containing particles of the metal (b) is observed, the oxygen concentration of the particles dispersed in the metal oxide (c) is measured, and it can be confirmed that the metal forming the particles is not an oxide.

The content of each of the carbon material (a), the metal (b), and the metal oxide (c) based on the total of the carbon material (a), the metal (b), and the metal oxide (c) is preferably set as follows. The content of the carbon material (a) is preferably 2% by mass or more and 80% by mass or less, more preferably 2% by mass or more and 30% by mass or less. The content of the metal (b) is preferably 5% by mass or more and 90% by mass or less, more preferably 20% by mass or more and 50% by mass or less. The content of the metal oxide (c) is preferably 5% by mass or more and 90% by mass or less, more preferably 40% by mass or more and 70% by mass or less.

A negative electrode active material in which all or part of the metal oxide (c) is an amorphous structure, and all or part of the metal (b) is dispersed in the metal oxide (c) can be made, for example, by a method disclosed in JP2004-47404A. For example, the metal oxide (c) is disproportionated at 900 to 1400° C. under an atmosphere containing a gas of an organic compound, such as methane gas, and at the same time, thermal CVD treatment is performed. Thus, a composite in which the metal element in the metal oxide (c) is nanoclustered as the metal (b), and the surface is covered with the carbon material (a) can be obtained.

In addition, the above negative electrode active material can also be made by mixing the carbon material (a), the metal (b), and the metal oxide (c) by mechanical milling.

The carbon material (a), the metal (b), and the metal oxide (c) are not particularly limited, and a particulate one can be used for each. By making the material of the negative electrode active material an aggregate of particles, the constraint force between different material particles can be kept moderate, and therefore, the generation of residual stress and residual strain caused by a difference in volume change accompanying charge and discharge can be suppressed. For example, the average particle diameter of the metal (b) is preferably smaller than the average particle diameter of the carbon material (a) and the average particle diameter of the metal oxide (c). By doing this, the metal (b) in which the volume change accompanying during charge and discharge is large has a relatively small particle diameter, and the carbon material (a) and the metal oxide (c) in which the volume change is small have a relatively large particle diameter, and therefore, dendrite formation and the pulverization of the alloy are more effectively suppressed. In addition, the intercalation and deintercalation of lithium is alternately performed in the order of the particles having a large particle diameter, the particles having a small particle diameter, and the particles having a large particle diameter in the process of charge and discharge, and thus, the generation of residual stress and residual strain is suppressed. The average particle diameter of the metal (b) can be, for example, 20 μm or less, and is preferably 15 μm or less. Here, the average particle diameter is a 50% cumulative diameter $D_{50}$ (median diameter) obtained by particle size distribution measurement by a laser diffraction scattering method.

In addition, the average particle diameter of the metal oxide (c) is preferably ½ or less of the average particle diameter of the carbon material (a), and the average particle diameter of the metal (b) is preferably ½ or less of the average particle diameter of the metal oxide (c). Further, it is more preferred that the average particle diameter of the metal oxide (c) is ½ or less of the average particle diameter of the carbon material (a), and the average particle diameter of the metal (b) is ½ or less of the average particle diameter of the metal oxide (c). When the average particle diameters are controlled in such a range, the effect of relieving the volume expansion of the metal and alloy phases can be more effectively obtained, and a secondary battery having excellent energy density and an excellent balance between cycle life and efficiency can be obtained. More specifically, it is preferred that the average particle diameter of silicon oxide (c) is ½ or less of the average particle diameter of graphite (a), and the average particle diameter of silicon (b) is ½ or less of the average particle diameter of the silicon oxide (c). The average particle diameter of the silicon (b) can be, for example, 20 μm or less, and is preferably 15 μm or less.

The negative electrode binder is not particularly limited. Examples thereof include polyvinylidene fluoride (PVdF), vinylidene fluoride-hexafluoropropylene copolymers, vinylidene fluoride-tetrafluoroethylene copolymers, styrene-butadiene copolymerized rubbers, polytetrafluoroethylene, polypropylene, polyethylene, polyimides, and polyamideimides.

The content of the negative electrode binder is preferably in the range of 1 to 30% by mass, more preferably 2 to 25% by mass, based on the total amount of the negative electrode active material and the negative electrode binder. By setting the content to 1% by mass or more, the adhesiveness between the active materials or between the active material and the current collector is improved, and the cycle characteristics are good. In addition, by setting the content to 30% by mass or less, the active material ratio is improved, and the negative electrode capacity can be improved.

The negative electrode current collector is not particularly limited, and aluminum, nickel, copper, silver, and alloys containing two or more of these are preferred because of electrochemical stability. Examples of its shape include foil, a flat plate shape, and a mesh shape.

The negative electrode can be made by forming a negative electrode active material layer containing a negative electrode active material and a negative electrode binder on a negative electrode current collector. The negative electrode active material layer can be formed by a general slurry coating method. Specifically, the negative electrode can be obtained by preparing a slurry containing a negative electrode active material, a binder, and a solvent, coating a negative electrode current collector with the slurry, drying it, and applying pressure as required. Examples of the method for coating with the negative electrode slurry include a doctor blade method, a die coater method, and a dip coating method. It is also possible to previously form a negative electrode active material layer and then form a thin film of aluminum, nickel, or an alloy thereof as a current collector by a method such as vapor deposition or sputtering to obtain a negative electrode.

(Separator)

Examples of the separator provided between the positive electrode and the negative electrode include porous polymer films, woven fabrics, and nonwoven fabrics made of polyolefins, such as polyethylene and polypropylene, polyimides, fluororesins, such as polyvinylidene fluoride, and the like, or ion-conducting polymer electrolyte membranes. These can be used alone or in combination.

(Shape and Packaging of Battery)

Examples of the shape of the battery include a cylindrical shape, a prismatic shape, a coin type, a button type, and a laminate type.

In the case of a laminate type, the electrodes and the separator are laminated in a planar shape as they are, and a portion having small R (a region close to the wound core of a wound structure, or a region corresponding to the folded-back site of a flat type wound structure) is not present. Therefore, when an active material in which the volume change accompanying charge and discharge is large is used, the laminate type battery is less susceptible to the adverse effect of the volume change of the electrode accompanying charge and discharge than a battery having a wound structure.

Examples of the package of the battery include stainless, iron, aluminum, titanium, or alloys thereof, or plated articles thereof. As the plating, for example, nickel plating can be used. When the battery is a laminate type, a laminate film is preferred as the package.

Examples of the metal foil layer on the resin substrate layer of the laminate film include aluminum, aluminum alloy, and titanium foil. Examples of the material of the thermally welded layer of the laminate film include thermoplastic polymer materials, such as polyethylene, polypropylene, and polyethylene terephthalate. In addition, each of the numbers of the resin substrate layers and metal foil layers of the laminate film is not limited to one and may be two or more. From the viewpoint of versatility and cost, an aluminum laminate film is preferred.

When a laminate film is used as the package, the volume change of the battery and the strain of the electrodes caused by the generation of gas occur more easily than when a metal can is used as the package. This is because the laminate film is more easily deformed by the internal pressure of the battery than the metal can. Further, when a secondary battery using a laminate film as a package is sealed, usually, the battery internal pressure is set lower than atmospheric pressure, and there is no extra space inside, and therefore, the generation of gas in the battery easily immediately leads to the volume change of the battery and the deformation of the electrodes. In addition, in the case of a laminate type battery, when gas is generated between the electrodes, the gas remains between the electrodes more easily than in the case of a battery having a wound structure, and therefore, there is a tendency that the spacing between the electrodes increases more easily. When a laminate film package is used, this tendency is more significant. According to this exemplary embodiment, the occurrence of such problems can be suppressed, and in even a laminate type battery using a laminate film package, a nonaqueous electrolytic solution secondary battery having excellent long-term reliability can be provided.

(Basic Structure of Battery)

A cross-sectional view of a laminate type lithium secondary battery according to this exemplary embodiment is shown in FIG. 1. As shown in FIG. 1, the lithium secondary battery according to this exemplary embodiment includes a positive electrode including a positive electrode current collector 3 made of a metal, such as aluminum foil, and a positive electrode active material layer 1 containing a positive electrode active material provided on the positive electrode current collector 3, and a negative electrode including a negative electrode current collector 4 made of a metal, such as copper foil, and a negative electrode active material layer 2 containing a negative electrode active material provided on the negative electrode current collector 4. The positive electrode and the negative electrode are laminated via a separator 5 made of a nonwoven fabric, a polypropylene microporous film, or the like, so that the positive electrode active material layer 1 and the negative electrode active material layer 2 are opposed to each other. This electrode pair is housed in a container formed of packages 6 and 7, such as aluminum laminate films. A positive electrode tab 9 is connected to the positive electrode current collector 3, and a negative electrode tab 8 is connected to the negative electrode current collector 4, and these tabs are pulled out to the outside of the container. An electrolytic solution is injected into the container, and the container is sealed. A structure in which an electrode group in which a plurality of electrode pairs are laminated is housed in a container can also be provided.

EXAMPLES

The present invention will be specifically described below by giving Examples, but the present invention is not limited to these Examples and can be carried out by making appropriate changes without departing from the spirit thereof.

Secondary batteries having the structure shown in FIG. 1 according to the following Examples and Comparative Example were made and evaluated.

Example 1

$LiNi_{0.5}Mn_{1.5}O_4$ (90 parts by mass) as a positive electrode active material, polyvinylidene fluoride (5 parts by mass) as a binder, and carbon black (5 parts by mass) as a conductive agent were mixed to prepare a positive electrode mixture. This positive electrode mixture was dispersed in N-methyl-2-pyrrolidone to prepare a positive electrode slurry. One surface of a 20 μm thick aluminum current collector was uniformly coated with this positive electrode slurry. The thickness of the coating film was adjusted so that the initial charge capacity per unit area was 2.5 mAh/cm². The coated current collector was dried and then compression-molded by a roll press to obtain a positive electrode.

As a negative electrode active material, synthetic graphite was used. This synthetic graphite was dispersed in a solution obtained by dissolving PVDF in N-methylpyrrolidone, to prepare a negative electrode slurry. The mass ratio of the negative electrode active material to the binder was 90/10 (active material/binder). A 10 μm thick Cu current collector was uniformly coated with this negative electrode slurry. The thickness of the coating film was adjusted so that the initial charge capacity was 3.0 mAh/cm². The coated current collector was dried and then compression-molded by a roll press to obtain a negative electrode.

The positive electrode and the negative electrode cut into 3 cm×3 cm were laminated so as to be opposed to each other via a separator. For the separator, a 25 μm thick microporous polypropylene film was used.

As the solvent of a nonaqueous electrolytic solution, a mixed solvent obtained by mixing ethylene carbonate (hereinafter referred to as "EC"), tris(2,2,2-trifluoroethyl)phosphate (hereinafter referred to as "TTFEP"), and 2H-perfluoro-5-methyl-3,6-dioxanonane ($CF_3CHF$—O—($CF_2CF$($CF_3$)O)—$C_3F_7$, hereinafter referred to as "ET7") as a fluorine-containing ether compound at a volume ratio (EC/TTFEP/ET7) of 30/60/10 was used. $LiPF_6$ was dissolved in this mixed solvent at a concentration of 1 mol/L to obtain a nonaqueous electrolytic solution.

The above electrode pair via the separator was packaged in an aluminum laminate film, the nonaqueous electrolytic solution was injected, and the aluminum laminate film was sealed to obtain a lithium secondary battery. As shown in FIG. 1, tabs were connected to the positive electrode and the negative electrode and electrically connected to the outside of the packaging container made of the aluminum laminate film.

After the lithium secondary battery was made, the volume (initial volume) was measured before charge and discharge. The measurement of the volume was performed by the Archimedes method. The volume increase rate was calculated according to the following formula.

volume increase rate (%)=100×(volume after charge and discharge−initial volume)/initial volume.

This lithium secondary battery was charged at 20 mA, and after the upper limit voltage reached 4.8 V, the lithium secondary battery was charged at constant voltage until the total charge time reached 2.5 hours. Then, the lithium secondary battery was discharged at 20 mA at constant current until a lower limit voltage of 3 V was reached. This charge and discharge was repeated 50 times. This charge and discharge was carried out in a thermostat at 45° C. At the point when 50 cycles of charge and discharge was performed, the volume of the lithium secondary battery was measured by the same method as the measurement before the charge and discharge. The measurement result is shown in Table 1.

Example 2

A lithium secondary battery was made and its volume was measured as in Example 1 except that as the fluorine-containing ether compound, 2H-perfluoro-5,8-dimethyl-3,6,9-trioxadodecane ($CF_3CHF$—O—($CF_2CF$($CF_3$)O)$_2$—$C_3F_7$, hereinafter referred to as "ET8") was used instead of ET7. The measurement result is shown in Table 1.

Comparative Example 1

A lithium secondary battery was made and its volume was measured as in Example 1 except that instead of the mixed solvent used in Example 1, the following mixed solvent containing no fluorine-containing ether compound and TTFEP was used. The measurement result is shown in Table 1.

Composition of mixed solvent: EC and diethyl carbonate (DEC) were mixed at a volume ratio (EC/DEC) of 3/7.

Reference Example 1

A lithium secondary battery was made and its volume was measured as in Example 1 except that instead of the mixed solvent used in Example 1, the following mixed solvent containing no fluorine-containing ether compound was used. The measurement result is shown in Table 1.

Composition of mixed solvent: EC and TTFEP were mixed at a volume ratio (EC/TTFEP) of 3/7.

Reference Example 2

A lithium secondary battery was made and its volume was measured as in Example 1 except that instead of the mixed solvent used in Example 1, the following mixed solvent containing no fluorine-containing ether compound was used. The measurement result is shown in Table 1.

Composition of mixed solvent: EC, TTFEP, and dipropyl ether (hereinafter referred to as "ET1") were mixed at a volume ratio (EC/TTFEP/ET1) of 3/6/1.

Reference Example 3

A lithium secondary battery was made and its volume was measured as in Example 1except that instead of the mixed solvent used in Example 1, the following mixed solvent containing no fluorine-containing ether compound was used. The measurement result is shown in Table 1.

Composition of mixed solvent: EC, TTFEP, and diethylene glycol dimethyl ether (hereinafter referred to as "ET2") were mixed at a volume ratio (EC/TTFEP/ET2) of 3/6/1.

Reference Example 4

A lithium secondary battery was made and its volume was measured as in Example 1 except that instead of the mixed solvent used in Example 1, the following mixed solvent containing no fluorine-containing ether compound was used. The measurement result is shown in Table 1.

Composition of mixed solvent: EC, TTFEP, and triethylene glycol dimethyl ether (hereinafter referred to as "ET3") were mixed at a volume ratio (EC/TTFEP/ET3) of 3/6/1.

Reference Example 5

A lithium secondary battery was made and its volume was measured as in Example 1 except that instead of the mixed solvent used in Example 1, the following mixed solvent containing no fluorine-containing ether compound was used. The measurement result is shown in Table 1.

Composition of mixed solvent: EC, TTFEP, and n-butyl-1,1,2,2-tetrafluoroethyl ether (hereinafter referred to as "ET4") were mixed at a volume ratio (EC/TTFEP/ET4) of 3/6/1.

Reference Example 6

A lithium secondary battery was made and its volume was measured as in Example 1 except that instead of the mixed solvent used in Example 1, the following mixed solvent containing no fluorine-containing ether compound was used. The measurement result is shown in Table 1.

Composition of mixed solvent: EC, TTFEP, and methyl-1H,1H-heptafluorobutyl ether (hereinafter referred to as "ET5") were mixed at a volume ratio (EC/TTFEP/ET5) of 3/6/1.

Reference Example 7

A lithium secondary battery was made and its volume was measured as in Example 1 except that instead of the mixed solvent used in Example 1, the following mixed solvent containing no fluorine-containing ether compound was used. The measurement result is shown in Table 1.

Composition of mixed solvent: EC, TTFEP, and fluoromethyl-2,2,3,3-tetrafluoropropyl ether (hereinafter referred to as "ET6") were mixed at a volume ratio (EC/TTFEP/ET6) of 3/6/1.

Example 3

A lithium secondary battery was made and its volume was measured as in Example 1 except that as the positive electrode active material, $Li(Li_{0.15}Ni_{0.2}Co_{0.1}Mn_{0.55})O_2$ was used. The measurement result is shown in Table 2.

Example 4

A lithium secondary battery was made and its volume was measured as in Example 1 except that as the positive electrode active material, $LiCoPO_4$ was used, and the charge voltage (upper limit voltage) was set to 5.0 V. The measurement result is shown in Table 2.

Reference Example 8

A lithium secondary battery was made and its volume was measured as in Example 3 except that instead of the mixed solvent used in Example 3, the following mixed solvent containing no fluorine-containing ether compound was used. The measurement result is shown in Table 2.

Composition of mixed solvent: EC and TTFEP were mixed at a volume ratio (EC/TTFEP) of 3/7.

Reference Example 9

A lithium secondary battery was made and its volume was measured as in Example 4 except that instead of the mixed solvent used in Example 4, the following mixed solvent containing no fluorine-containing ether compound was used. The measurement result is shown in Table 2.

Composition of mixed solvent: EC and TTFEP were mixed at a volume ratio (EC/TTFEP) of 3/7.

TABLE 1

|  | Composition of solvent | Blending ratio (volume ratio) | Charge and discharge range (V) | Volume increase rate (%) |
|---|---|---|---|---|
| Example 1 | EC/TTFPE/ET7 | 3/6/1 | 4.8-3 | 2.5 |
| Example 2 | EC/TTFPE/ET8 | 3/6/1 | 4.8-3 | 3 |
| Comparative Example 1 | EC/DEC | 3/7 | 4.8-3 | 150 |
| Reference Example 1 | EC/TTFPE | 3/7 | 4.8-3 | 4 |
| Reference Example 2 | EC/TTFPE/ET1 | 3/6/1 | 4.8-3 | 24 |

TABLE 1-continued

| | Composition of solvent | Blending ratio (volume ratio) | Charge and discharge range (V) | Volume increase rate (%) |
|---|---|---|---|---|
| Reference Example 3 | EC/TTFPE/ET2 | 3/6/1 | 4.8-3 | 22 |
| Reference Example 4 | EC/TTFPE/ET3 | 3/6/1 | 4.8-3 | 23 |
| Reference Example 5 | EC/TTFPE/ET4 | 3/6/1 | 4.8-3 | 10 |
| Reference Example 6 | EC/TTFPE/ET5 | 3/6/1 | 4.8-3 | 9 |
| Reference Example 7 | EC/TTFPE/ET6 | 3/6/1 | 4.8-3 | 7.5 |

TABLE 2

| | Composition of solvent | Blending ratio (volume ratio) | Charge and discharge range (V) | Volume increase rate (%) |
|---|---|---|---|---|
| Example 3 | EC/TTFPE/ET7 | 3/6/1 | 4.8-3 | 4.5 |
| Example 4 | EC/TTFPE/ET7 | 3/6/1 | 5-3 | 4 |
| Reference Example 8 | EC/TTFPE | 3/7 | 4.8-3 | 18 |
| Reference Example 9 | EC/TTFPE | 3/7 | 5-3 | 7 |

Next, using the batteries of Example 1, Example 2, and Reference Example 1, charge and discharge characteristics in a low temperature environment (0° C.) were evaluated.

Each battery was charged at a current value of 20 mA, and after an upper limit voltage of 4.8 V was reached, the battery was charged at constant voltage with the current value controlled until the total charge time reached 10 hours. Then, the battery was discharged at 20 mA at constant current until a lower limit voltage of 3 V was reached. The battery was left for 5 minutes (the voltage increased while the battery was left), and then discharged at 4 mA at constant current until a lower limit voltage of 3 V was reached. The ratio (CH/CT) of the capacity value (CH) during the discharge at 20 mA to the sum (CT) of the capacity value (CH) during the discharge at 20 mA and the capacity value (CL) during the discharge at 4 mA at this time was evaluated as the discharge capacity ratio (%). The results are shown in Table 3.

TABLE 3

| | Composition of solvent | Discharge capacity ratio (%) |
|---|---|---|
| Example 1 | EC/TTFPE/ET7 | 87 |
| Example 2 | EC/TTFPE/ET8 | 86 |
| Reference Example 1 | EC/TTFPE | 69 |

As shown in the result of Reference Example 1 in Table 3, it is seen that when no fluorine-containing ether compound is included, the discharge capacity value decreases when the battery is discharged at a high rate such as 1 C at a low temperature such as 0° C. On the other hand, as shown in the results of Examples 1 and 2, when a fluorine-containing ether compound was included, relatively high capacity was obtained even if the battery was discharged at a high rate such as 1 C at a low temperature such as 0° C. It is presumed that in a solvent containing a fluorine-containing ether compound, the temperature dependence of ionic conductivity is relatively small, and the ionic conductivity is high even at low temperature, and therefore, such results were obtained.

As shown in Table 1 and Table 2, according to this exemplary embodiment, the amount of gas generated inside the battery can be reduced even if the battery is operated at high voltage (around 5 V) in a high temperature environment (about 45° C.). Therefore, according to this exemplary embodiment, a high energy density lithium secondary battery having excellent life characteristics can be provided. In addition, the operating characteristics of a lithium secondary battery at low temperature can also be improved.

An advantage of a laminate type battery packaged and sealed in an aluminum laminate film is that it is lightweight. But, a problem is that when gas is generated inside the battery, appearance deformation, such as swelling, occurs easily, and the internal electrode laminated structure is also easily adversely affected. According to this exemplary embodiment, gas generation can be suppressed, and therefore, this exemplary embodiment is particularly effective for a laminate type battery packaged in a laminate film.

The present invention has been described above with reference to the exemplary embodiment and the Examples, but the present invention is not limited to the above exemplary embodiment and Examples. Various changes that can be understood by those skilled in the art may be made to the configuration and details of the present invention within the scope of the present invention.

REFERENCE SIGNS LIST 1 positive electrode active material layer
2 negative electrode active material layer
3 positive electrode current collector
4 negative electrode current collector
5 separator
6 laminate package
7 laminate package
8 negative electrode tab
9 positive electrode tab

The invention claimed is:
1. A lithium secondary battery comprising a positive electrode comprising a positive electrode active material capable of intercalating and deintercalating lithium ions, a negative electrode comprising a negative electrode active material capable of intercalating and deintercalating lithium ions, and a nonaqueous electrolytic solution, wherein the positive electrode active material comprises an active material capable of intercalating or deintercalating lithium ions at a potential of 4.5 V or more, represented by general formula (3):

$$Li_a(M_xMn_{2-x-y}Y_y)(O_{4-w}Z_w) \quad (3)$$

wherein $0 \leq x \leq 1.2$, $0 \leq y$, $x+y<2$, $0 \leq a$ $1.2$, and $0 \leq w \leq 1$ hold, M is at least one selected from Co, Ni, Fe, Cr, and Cu, Y is at least one selected from Li, B, Na, Al, Mg, Ti, Si, K, and Ca, and Z is at least one of F and Cl, and the nonaqueous electrolytic solution comprises a fluorine-containing ether compound represented by the following general formula (1):

$$C_{m1}H_{2m1+1-n1}F_{n1}O-)C_{m2}H_{2m2-n}F_{n2}O)p-(C_{m3}H_{2m3-n3}F_{n3}O)q-(C_{m4}H_{2m4-n}4F_{n4}O)r-C_{m5}H_{2m5+1-n5}F_{n5} \quad (1)$$

wherein m1 to m5 are each independently a natural number of 1 to 5, p, q, and r are each independently 0 or a natural number and satisfy $1 \leq p+q+r \leq 3$, and n1 to n5 each independently represent a natural number, in general formula (1), n2=2m2, n3=2m3, and n4=2m4 hold, a content of the fluorine-containing ether compound in a solvent of the nonaqueous electrolytic solution is in the range of 5% by volume or more and 20% by volume or less, the nonaqueous electrolytic solution further comprises a fluorine-containing phosphate compound as a solvent component, a content of the fluorine-containing phosphate compound in the solvent of the nonaqueous electrolytic solution is in the range of more than 30% by volume and 70% by volume or less, wherein the fluorine-containing phosphate compound is tris(2,2,2-trifluoroethyl)phosphate), the nonaqueous electrolytic solution further comprises a cyclic carbonate compound as a solvent component, a content of the cyclic carbonate compound in the solvent of the nonaqueous electrolytic solution is in the range of 20% by volume or more and 50% by volume or less, and the total content of the cyclic carbonate compound, the fluorine-containing phosphate compound, and the fluorine-containing ether compound represented by general formula (1) in the entire solvent is 80% by volume or more.

2. The lithium secondary battery according to claim 1, wherein in general formula (1), n1 to n5 are each 2 or more.

3. The lithium secondary battery according to claim 1, wherein in general formula (1), m2, m3, and m4 are each 3 or more.

4. The lithium secondary battery according to claim 1, wherein in general formula (1), $1 \leq p+q+r \leq 2$ is satisfied.

5. The lithium secondary battery according to claim 1, wherein the fluorine-containing ether compound is at least one of $CF_3CHF—O—(CF_2CF(CF_3)O)—C_3F_7$ and
$CF_3CHF—O—(CF_2CF(CF_3)O)_2—C_3F_7$.

6. The lithium secondary battery according to claim 1, wherein the nonaqueous electrolytic solution further comprises a fluorine-containing organic solvent.

7. The lithium secondary battery according to claim 6, wherein the fluorine-containing organic solvent is selected from the group consisting of a fluorine-containing chain carbonate compound, a fluorine-containing ether compound, and a fluorine-containing carboxylate compound.

8. The lithium secondary battery according to claim 1, further comprising
a separator, the positive electrode and the negative electrode being disposed opposed to each other via the separator, and
a laminate film package containing the separator, the positive electrode, and the negative electrode.

9. The lithium secondary battery according to claim 1, wherein the fluorine-containing ether compound is a compound represented by the following general formula (2):

$$C_{m1}H_{2m1+1-n1}F_{n1}O-(C_{m2}F_{2m2}O)p-C_{m3}H_{2m3+1-n2}F_{n2} \quad (2)$$

wherein m1, m2, and m3 each independently represent a natural number of 1 to 5, p represents 1 or 2, and $n_1$ and $n_2$ each independently represent a natural number.

10. The lithium secondary battery according to claim 1, wherein in general formula (3), x is $0.4 \leq x \leq 1.1$.

11. The lithium secondary battery according to claim 1, wherein the content of the fluorine-containing phosphate compound in the solvent of the nonaqueous electrolytic solution is in the range of 60% by volume or more and 70% by volume or less.

12. The lithium secondary battery according to claim 1, wherein the content of the fluorine-containing phosphate compound in the solvent of the nonaqueous electrolytic solution is in the range of 30% by volume or more and 60% by volume or less.

13. The lithium secondary battery according to claim 1, wherein in the general formula (3), M is Ni or Ni and Co, y=0, w=0, the cyclic carbonate compound is ethylene carbonate, and
the fluorine-containing ether compound represented is 2H-perfluoro-5-methyl-3,6-dioxanonane ($CF_3CHF—O—(CF_2CF(CF_3)O)—C_3F_7$) or 2H-perfluoro-5,8-dimethyl-3,6,9-trioxadodecane ($CF_3CHF—O—(CF_2CF(CF_3)O)_2—C_3F_7$).

14. A lithium secondary battery comprising a positive electrode comprising a positive electrode active material capable of intercalating and deintercalating lithium ions, a negative electrode comprising a negative electrode active material capable of intercalating and deintercalating lithium ions, and a nonaqueous electrolytic solution, wherein the positive electrode active material comprises an active material capable of intercalating or deintercalating lithium ions at a potential of 4.5 V or more, the active material is at least one selected from the group consisting of $LiNi_{0.5}Mn_{1.5}O_4$; $LiCoMnO_4$; $LiCrMnO_4$; $LiFeMnO_4$; $LiCu_{0.5}Mn_{1.5}O_4$; $LiM1_xMn_{2-x-y}M2_yO_4$, wherein M1 is at least one selected from Ni, Fe, Co, Cr, and Cu, $0.4<x<1.1$ holds, and M2 is at least one selected from Li, Al, B, Mg, Si, and transition metals, and $0<y<0.5$; and those obtained by replacing part of the oxygen of these materials by fluorine or chlorine, and the nonaqueous electrolytic solution comprises a fluorine-containing ether compound represented by the following general formula (1):

$$C_{m1}H_{2m1+1-n1}F_{n1}O-)C_{m2}H_{2m2-n}F_{n2}O)p-(C_{m3}H_{2m3-n3}F_{n3}O)q-(C_{m4}H_{2m4-n}4F_{n4}O)r-C_{m5}H_{2m5+1-n5}F_{n5} \quad (1)$$

wherein m1 to m5 are each independently a natural number of 1 to 5, p, q, and r are each independently 0 or a natural number and satisfy $1 \leq p+q+r \leq 3$, and n1 to n5 each independently represent a natural number, in general formula (1), n2=2m2, n3=2m3, and n4=2m4 hold, a content of the fluorine-containing ether compound in a solvent of the nonaqueous electrolytic solution is in the range of 5% by volume or more and 20% by volume or less, the nonaqueous electrolytic solution further comprises a fluorine-containing phosphate compound as a solvent component, a content of the fluorine-containing phosphate compound in the solvent of the nonaqueous electrolytic solution is in the range of more than 30% and 70% by volume or less, wherein the fluorine-containing phosphate compound is tris(2,2,2-trifluoroethyl)phosphate), the nonaqueous electrolytic solution further comprises a cyclic carbonate compound as a solvent component, a content of the cyclic carbonate compound in the solvent of the nonaqueous electrolytic solution is in the range of 20% by volume or more and 50% by volume or less, and the total content of the cyclic carbonate compound, the fluorine-containing phosphate compound, and the fluorine-containing ether compound represented by general formula (1) in the entire solvent is 80% by volume or more.

15. The lithium secondary battery according to claim 14, wherein the content of the fluorine-containing phosphate compound in the solvent of the nonaqueous electrolytic solution is in the range of 60% by volume or more and 70% by volume or less.

16. The lithium secondary battery according to claim 14, wherein the content of the fluorine-containing phosphate compound in the solvent of the nonaqueous electrolytic solution is in the range of 30% by volume or more and 60% by volume or less.

* * * * *